(12) United States Patent
Kimura et al.

(10) Patent No.: US 12,298,661 B2
(45) Date of Patent: May 13, 2025

(54) MASK DESIGN METHOD AND STORAGE MEDIUM THEREOF

(71) Applicant: Kioxia Corporation, Tokyo (JP)

(72) Inventors: Taiki Kimura, Kawasaki (JP); Tetsuaki Matsunawa, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 624 days.

(21) Appl. No.: 17/668,489

(22) Filed: Feb. 10, 2022

(65) Prior Publication Data

US 2023/0089403 A1 Mar. 23, 2023

(30) Foreign Application Priority Data

Sep. 21, 2021 (JP) .................... 2021-153350

(51) Int. Cl.
*G03F 1/36* (2012.01)
*G06F 30/20* (2020.01)
*G06F 119/18* (2020.01)
*G06F 119/22* (2020.01)

(52) U.S. Cl.
CPC ............ *G03F 1/36* (2013.01); *G06F 30/20* (2020.01); *G06F 2119/18* (2020.01); *G06F 2119/22* (2020.01)

(58) Field of Classification Search
CPC ........ G03F 1/36; G06F 30/20; G06F 2119/18; G06F 2119/22
USPC ............. 716/53, 54, 55; 700/98, 120, 121; 378/34, 35; 430/4, 5
See application file for complete search history.

(56) References Cited

U.S. PATENT DOCUMENTS

| 7,735,053 | B2 | 6/2010 | Harazaki |
| 7,908,572 | B2 * | 3/2011 | Zhang ............. G03F 7/705 716/54 |
| 7,987,434 | B2 | 7/2011 | Granik et al. |

(Continued)

FOREIGN PATENT DOCUMENTS

| JP | 2008-033277 A | 2/2008 | |
| JP | 2012198411 A * | 10/2012 | ............ G03F 1/36 |
| WO | WO-2019224623 A1 * | 11/2019 | ............ G01V 1/282 |

OTHER PUBLICATIONS

Yu et al., "The application of a new stochastic search algorithm "Adam" in inverse lithography technology (ILT) in critical recording head fabrication process", Proceedings of SPIE, vol. 11613, 2021, 9 pages.

(Continued)

*Primary Examiner* — Phallaka Kik
(74) *Attorney, Agent, or Firm* — Oblon, McClelland, Maier & Neustadt, L.L.P.

(57) ABSTRACT

According to one embodiment, a mask design method includes the following configuration. The method includes setting evaluation points on a circuit pattern created based on design data, setting a parameter that defines a shape of the mask pattern on the mask pattern corresponding to the circuit pattern and calculating an optical image intensity on the evaluation points set on the circuit pattern based on the mask pattern and the parameter. The method includes calculating an evaluation value relating to the optical image intensity by an objective function based on the optical image intensity and optimizing the parameter using a value of a partial differential for the parameter in the objective function to minimize the evaluation value calculated by the objective function.

14 Claims, 11 Drawing Sheets

(56) References Cited

U.S. PATENT DOCUMENTS

| | | | |
|---|---|---|---|
| 2005/0204322 A1* | 9/2005 | Kotani | G06F 30/398 716/52 |
| 2006/0085773 A1* | 4/2006 | Zhang | G03F 7/705 716/54 |
| 2012/0244707 A1* | 9/2012 | Uno | G03F 7/70941 716/51 |
| 2013/0149636 A1* | 6/2013 | Gyoda | G06F 30/00 716/51 |
| 2014/0007023 A1* | 1/2014 | Shin | G06F 30/398 716/51 |
| 2014/0220786 A1* | 8/2014 | Lukanc | G03F 1/36 438/758 |
| 2015/0089459 A1 | 3/2015 | Liu | |
| 2019/0155169 A1* | 5/2019 | Moon | G03F 1/70 |
| 2021/0018850 A1 | 1/2021 | Slachter et al. | |

OTHER PUBLICATIONS

Kingma et al., "Adam: A Method for Stochastic Optimization", arXiv: 1412.6980v9, 2017, 15 pages.

\* cited by examiner

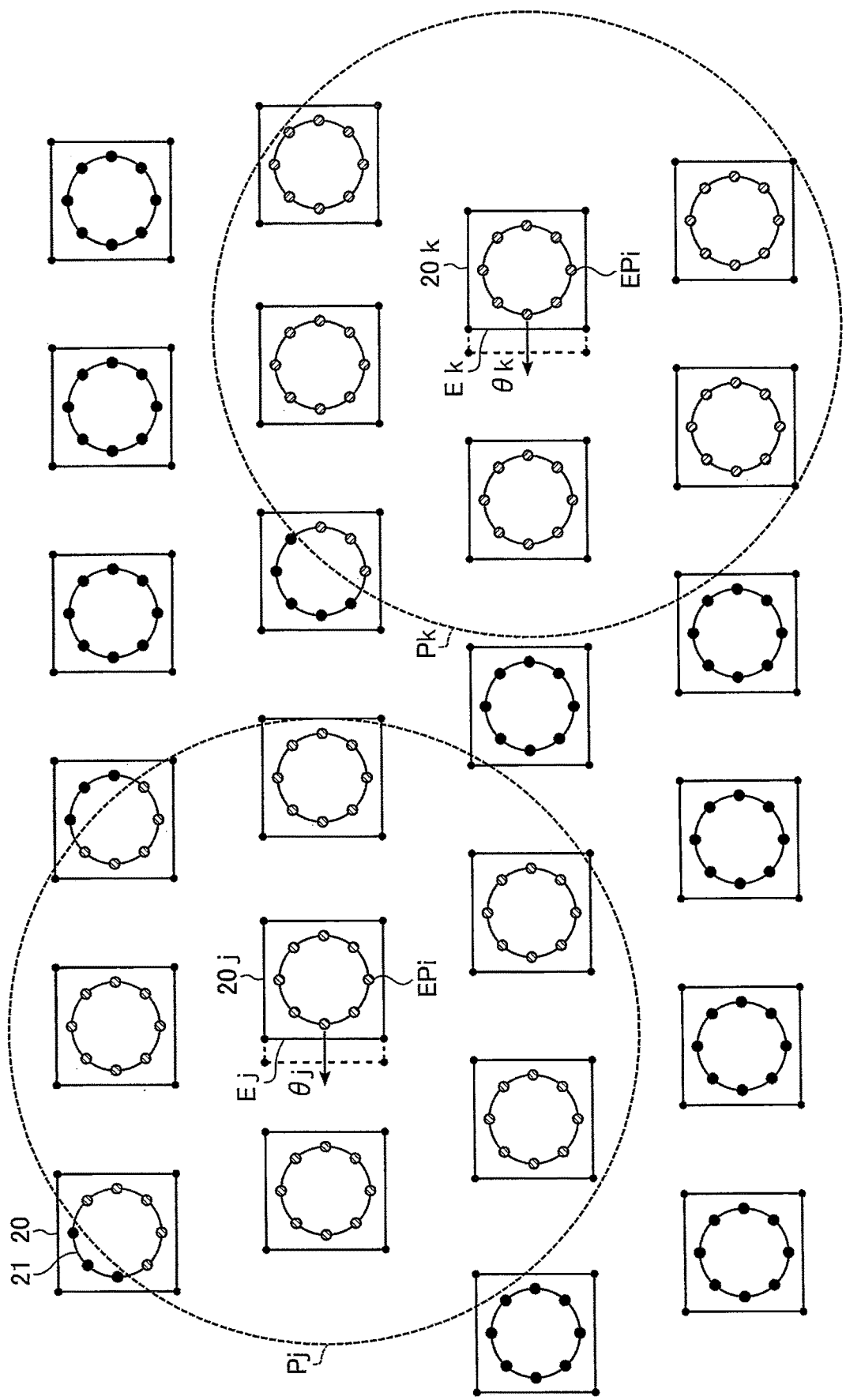
F I G. 4

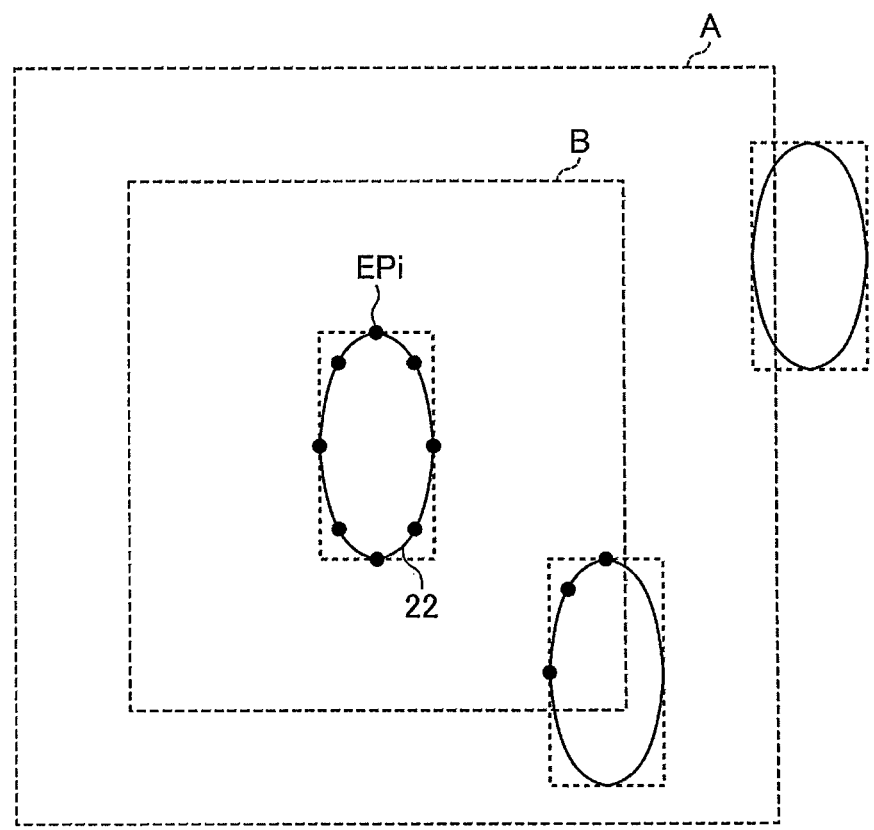
F I G. 6

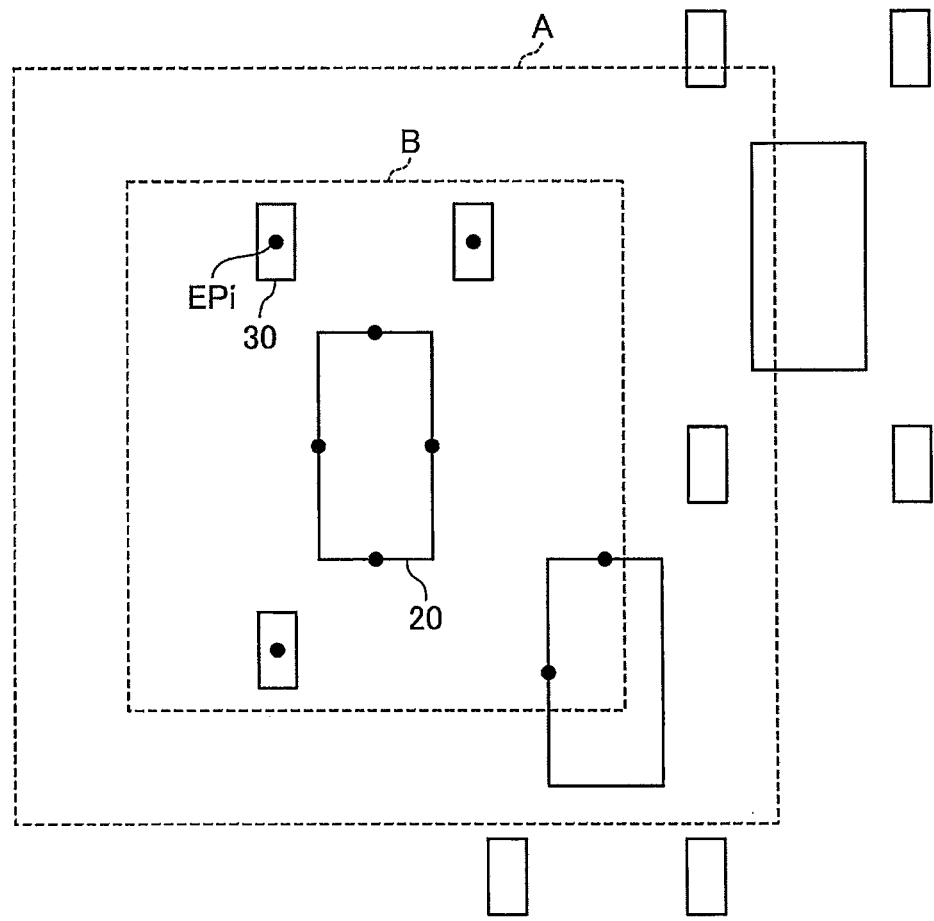
F I G. 10

MASK DESIGN METHOD AND STORAGE MEDIUM THEREOF

CROSS-REFERENCE TO RELATED APPLICATIONS

This application is based upon and claims the benefit of priority from Japanese Patent Application No. 2021-153350, filed Sep. 21, 2021, the entire contents of which are incorporated herein by reference.

FIELD

Embodiments described herein relate generally to a mask design method and a storage medium thereof

BACKGROUND

In mask design for a semiconductor device, a mask pattern to be formed on a mask is calculated using a circuit pattern and optical proximity correction (OPC).

BRIEF DESCRIPTION OF THE DRAWING(S)

FIG. 4 is a diagram explaining the optical proximity correction processing in the embodiment.

FIG. 6 is a diagram showing an example of setting of evaluation points performed on a target pattern in the embodiment.

FIG. 10 is a diagram showing an example in which evaluation points are set in an auxiliary pattern in a modification.

DETAILED DESCRIPTION

In general, according to one embodiment, a mask design method for designing a mask pattern using optical proximity correction includes: setting evaluation points on a circuit pattern created based on design data; setting a parameter that defines a shape of the mask pattern on at least part of the mask pattern corresponding to the circuit pattern; calculating an optical image intensity on the evaluation points that are set on the circuit pattern based on the mask pattern and the parameter; calculating an evaluation value relating to the optical image intensity by an objective function based on the optical image intensity; and optimizing the parameter using a value of a partial differential for the parameter in the objective function to minimize the evaluation value calculated by the objective function, wherein a set of the evaluation points used in computation of the objective function is changed for each parameter when computation of the partial differential is performed.

Hereinafter, embodiments will be described with reference to the drawings. In the descriptions below, constituent elements having the same functions and configurations will be denoted by the same reference symbols. The embodiments to be described below are shown as an example of a device or a method for embodying the technical idea of the embodiments, and are not intended to limit the material, shape, structure, arrangement, etc. of components to those described below.

Each of the function blocks may be implemented in the form of hardware, computer software, or a combination thereof. The function blocks are not necessarily separated as in the following examples. For example, a function may be partly executed by a function block different from the function block described as an example. In addition, the function block described as an example may be divided into smaller function subblocks.

Embodiment

A mask design method of the embodiment is described.

In mask design for a semiconductor device (or semiconductor integrated circuit), a mask pattern (or mask pattern data) that should be created on a mask is calculated based on a circuit pattern (or circuit pattern data) and an optical proximity correction process. Lithography simulation is performed on the mask pattern to calculate a resist pattern (or a simulation pattern), which is created on a photoresist when the mask pattern is printed on the photoresist for example.

The mask designed in this example is used with a lithography technique for transferring a desired circuit pattern on a semiconductor substrate (for example, a wafer). With the lithography technique using the mask, semiconductor device in which an integrated circuit is created is manufactured, for example.

1. Mask Design Apparatus

Figure 1:
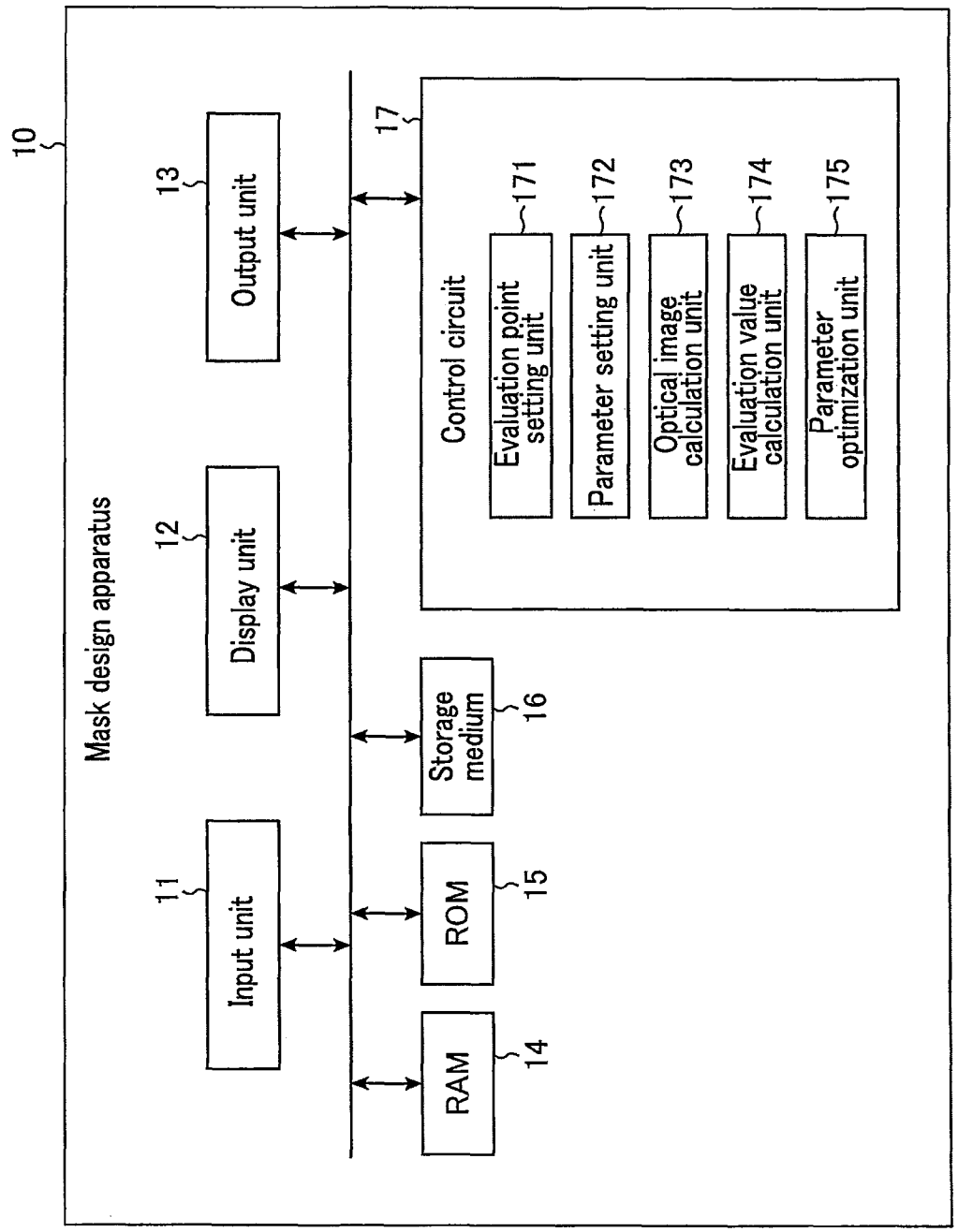
FIG. 1 is a block diagram showing a configuration of a mask design apparatus used in a mask design method according to an embodiment.

A mask design apparatus used in a mask design method according to an embodiment is described. FIG. 1 is a block diagram showing the mask design apparatus used in the mask design method according to the embodiment.

The mask design apparatus 10 is configured to be capable of designing a mask pattern having a shape most suitable for transferring a desired resist pattern on a semiconductor substrate, for example. The mask design apparatus 10 includes an input unit 11, a display unit 12, an output unit 13, a random access memory (RAM) 14, a read only memory (ROM) 15, a storage medium 16, and a control circuit 17.

The input unit 11 includes a keyboard and a mouse, etc. with which a user inputs data, etc. The input unit 11 includes an input circuit. The input circuit performs interface processing when circuit pattern data and conditions for optical proximity correction, etc. are input from an external device (a circuit design apparatus or an external database, etc.). For example, if data is input from an external device via a wireless communication, the mask design apparatus 10 includes a communication unit (not shown) and the input circuit is connected to the communication unit.

The display unit 12 outputs a result of processing by the control circuit 17 to a user. The display unit 12 includes, for example, a display screen (e.g., a liquid crystal display (LCD), an electroluminescent (EL) display, or a cathode ray tube display, etc.).

The output unit 13 includes an output circuit for outputting a result of processing by the control circuit 17 to an external device. The output unit 13 performs interface processing when data is output to an external device. For example, when data is output to an external device via a radio communication, the output circuit is connected to the communication unit. The output unit 13 may include a printer to output a result of processing by the control circuit 17, for example.

The RAM 14 temporarily stores input data and data generated when a mask pattern is designed. The input data may contain circuit pattern data, conditions for optical proximity correction, exposure conditions (exposure dose, wavelength of exposure light, and numerical aperture (NA), etc.), process conditions (foundation structure and resist condition, etc.), and user-input data, and the like.

The ROM 15 includes a storage circuit storing programs for performing mask pattern design. The control circuit 17 performs computation based on the programs stored in the ROM 15 to perform mask pattern design.

The storage medium 16 stores programs for performing the mask design method of the embodiment. The storage medium 16 accumulates information of the stored programs, etc. in such a manner that a computer or other device can read the information. In the storage medium 16, information of the programs, etc. is accumulated by electric, magnetic, optical, mechanical, or chemical actions. The control circuit 17 may read a program for performing mask pattern design from this storage medium 16 and perform the same. The storage medium 16 is implemented detachably on the mask design apparatus 10.

The control circuit 17 is comprised of a central processing unit (CPU) or a processor, for example, and controls the mask design apparatus 10. The control circuit 17 includes an evaluation point setting unit 171, a parameter setting unit 172, an optical image calculation unit 173, an evaluation value calculation unit 174, and a parameter optimization unit 175.

The evaluation point setting unit 171 sets evaluation points on a circuit pattern created based on circuit design data. The evaluation points that are set on the circuit pattern will be described later in detail.

The parameter setting unit 172 sets a parameter that defines a shape of a mask pattern on at least a part of the mask pattern corresponding to the circuit pattern. The parameter that is set on the mask pattern will be described later in detail.

The optical image calculation unit 173 calculates an optical image intensity on each evaluation point that is set on the mask pattern based on the mask pattern and the parameter. The optical image on an evaluation point means an optical image within an area around the evaluation point (for example, a 2.4 μm square area if an optical diameter is 1.2 μm) and formed on a photoresist on a semiconductor substrate by light irradiated on a mask pattern on a mask passed via a projection lens system. The optical image intensity is an intensity of the optical image.

The evaluation value calculation unit 174 calculates an evaluation value relating to the optical image intensity by an objective function based on the optical image intensity.

The parameter optimization unit 175 optimizes the parameters using a value of a partial differential of the parameter in the objective function so that the evaluation value calculated by the objective function is minimized.

2. Flow of Mask Production Including Mask Design Method

Figure 2:
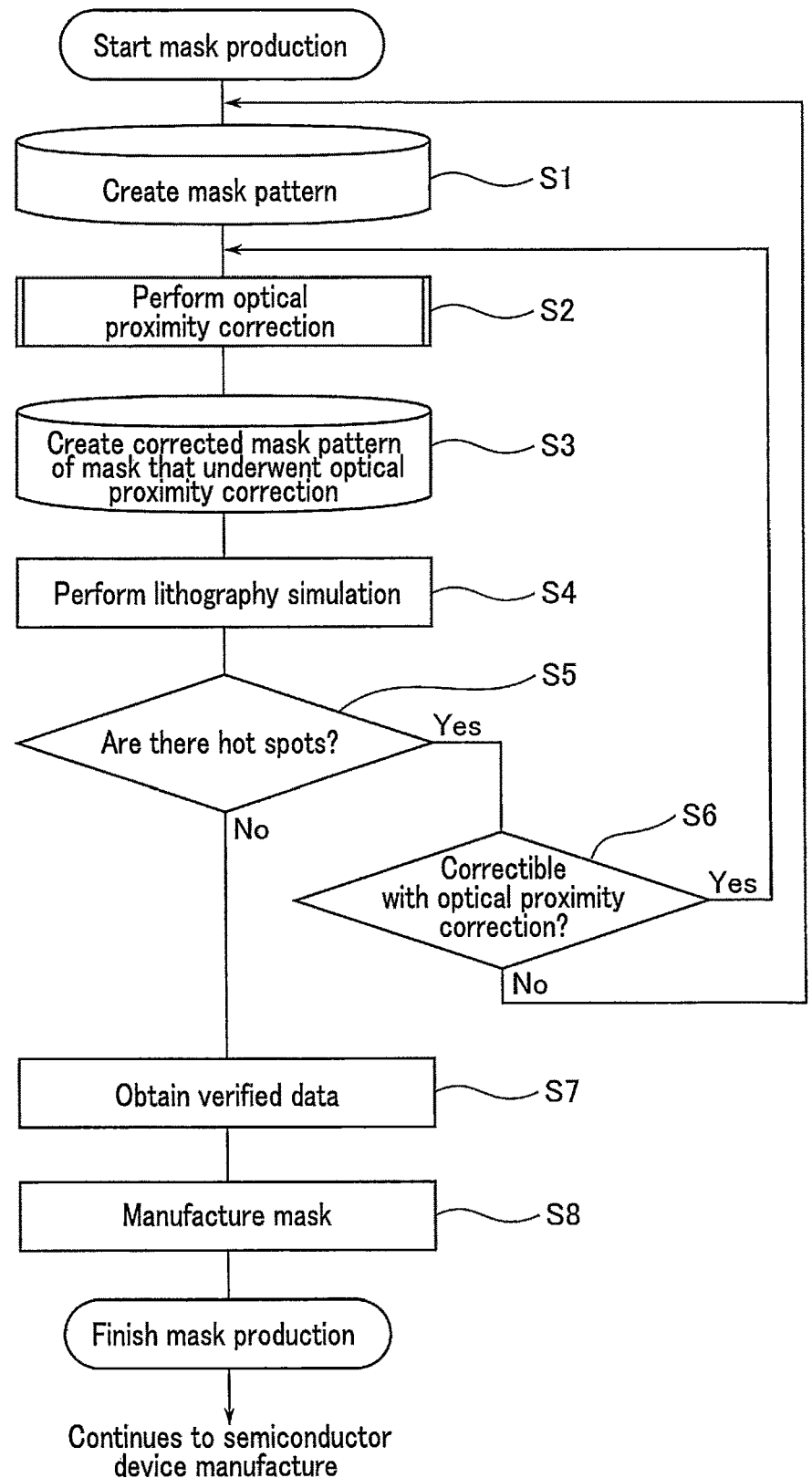
FIG. 2 is a flowchart showing a mask producing process including the mask design method according to the embodiment.

Hereinafter, a flow of mask production including the mask design method of the embodiment will be described. FIG. 2 is a flowchart showing a mask producing process. The mask design apparatus 10 as described below performs the process of mask producing, except for the steps relating to mask manufacturing.

First, a desired circuit pattern (or target pattern) that needs to be transferred onto a photoresist is created based on circuit design data of a semiconductor device (S1). Then, a mask pattern assumed to have formed on a mask is created based on the circuit pattern. The mask pattern at the initial stage is the same as the target pattern; however, the mask pattern is corrected thereafter through the optical proximity correction and lithography simulation, which are described later. Hereinafter, a mask pattern that has undergone a correction process will be called a "corrected mask pattern".

Next, optical proximity correction is performed on the mask pattern (S2). Optical proximity correction is a process of correcting a mask pattern so that a difference between a transferred pattern transferred from the mask pattern and a target pattern is minimized. A corrected mask pattern is created by performing this optical proximity correction on the mask pattern (S3). Details of the optical proximity correction used in the present embodiment will be described later.

Next, the lithography simulation is performed on the corrected mask pattern corrected by the optical proximity correction (S4). In the lithography simulation, a pattern to be transferred on a photoresist (hereinafter, a "simulation pattern") is calculated when the mask pattern is printed on the photoresist, for example.

Next, it is determined whether or not there are hot spots (or dangerous portions) in the calculated simulation pattern (S5). In other words, it is determined whether or not there is a part not in compliance with rules in the simulation pattern, for example whether or not there is a part with a high chance that a malfunction such as a shortcut between patterns or disconnection between patterns may occur.

If there is a hot spot in the simulation pattern (Yes), it is determined whether or not the hot spot can be corrected by the optical proximity correction (S6). If the hot spots can be corrected by the optical proximity correction (Yes), the process returns to step S2 and the optical proximity correction is once again performed. If the hot spot cannot be corrected by the optical proximity correction (No) on the other hand, the process returns to step S1 and the mask pattern creation is once again performed.

In step S5, if there is no hot spot in the simulation pattern calculated by lithography simulation (No), the corrected mask pattern is obtained as verified data (S7).

Thereafter, a mask is manufactured using verified data (S8). For example, a pattern is drawn on a photoresist placed on a mask blank with an electron beam drawing technique using the verified data, and etching, resist stripping, and washing, etc. are performed to manufacture a mask. The mask production is thus finished.

Figure 3:
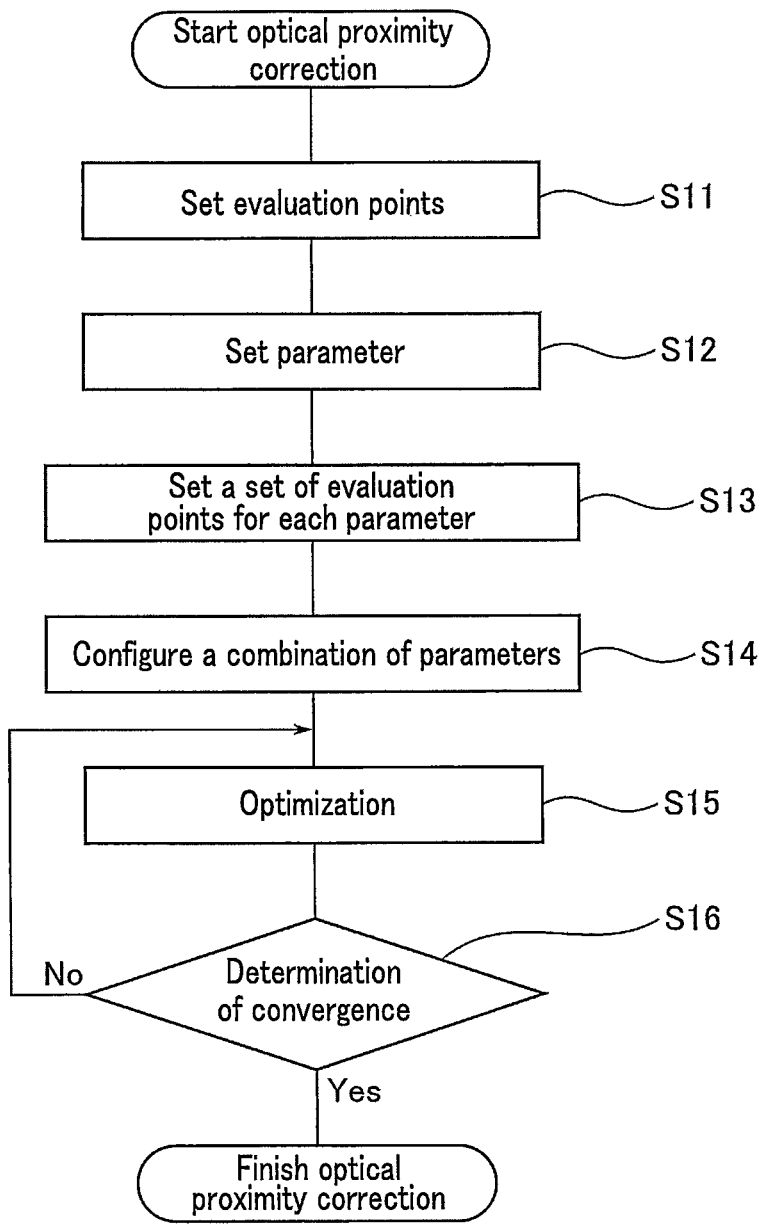
FIG. 3 is a flowchart showing optical proximity correction processing in the embodiment.

Hereinafter, the optical proximity correction performed in step S2 shown in FIG. 2 is explained. FIG. 3 is a flowchart showing the optical proximity correction in the embodiment. FIG. 4 is a diagram explaining the optical proximity correction and shows the corrected mask pattern, the simulation pattern, and the evaluation points, etc.

First, the corrected mask pattern, the simulation pattern, and the evaluation points shown in FIG. 4 are explained. The corrected mask pattern includes for example a plurality of pattern shapes 20. In each pattern shape 20, a simulation pattern 21, which is transferred and created from the pattern shape 20, is arranged. The simulation pattern 21 shown in FIG. 4 is the simulation pattern 21 after the mask pattern correction is finished and matches the target pattern. On the simulation pattern 21 or the target pattern, a plurality of evaluation points Epi are configured (i is a natural number equal to or greater than 1).

The optical proximity correction in the embodiment is explained with reference to FIG. 3.

First, a plurality of evaluation points EPi are set on either an initial mask pattern or a target pattern (or a simulation pattern 21) (S11). For example, the initial mask pattern is a desired circuit pattern created in accordance with circuit design data and matches the target pattern. The evaluation points EPi indicate the points for which an optical image intensity is calculated. The optical image intensity is an intensity of an image formed on a photoresist from light radiated on a mask pattern or a corrected mask pattern passed through a projection lens system.

Figure 5:
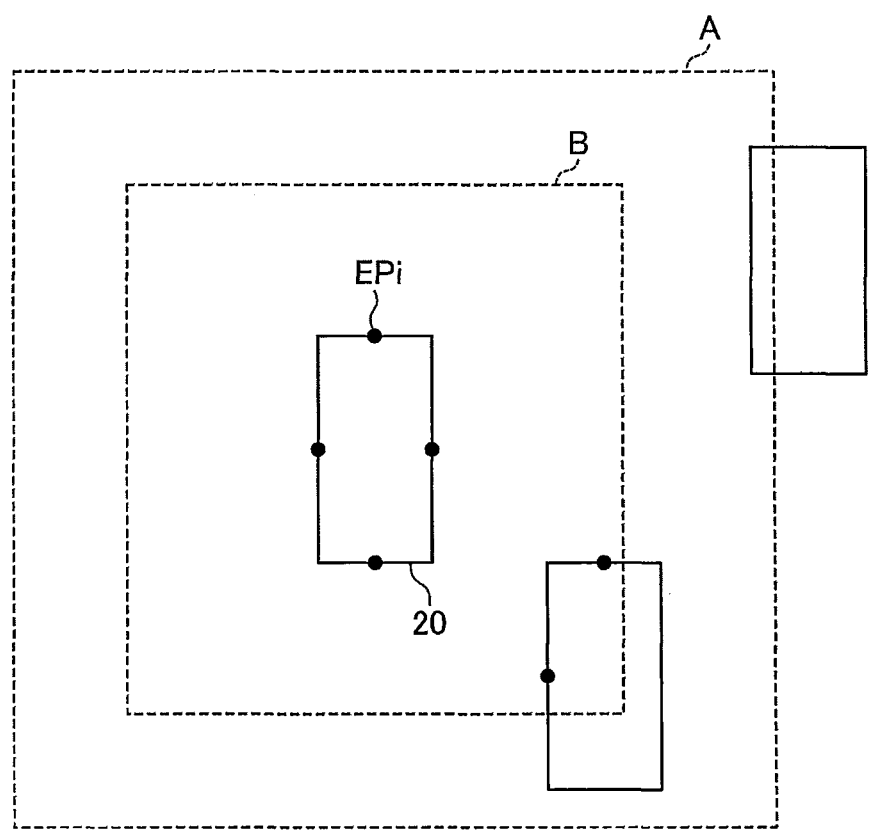
FIG. 5 is a diagram showing an example of setting of evaluation points performed on a circuit pattern in the embodiment.

FIG. 5 shows an example where the evaluation points are set to the mask pattern of the initial stage when it is identical to the target pattern. As shown in FIG. 5, for example, if the mask pattern of the initial stage includes the pattern shape 20 and the pattern shape 20 has a rectangular shape, evaluation points EPi are arranged around the center of each side of the rectangle. The area A indicates an area where an edge (described later) is set for the pattern shape 20. The area B indicates an area where evaluation points are set for the edge.

The arrangement of the evaluation points shown in FIG. 5 is only an example, and the evaluation points can be arranged as appropriate in accordance with a shape of the target pattern. For example, with consideration given to the rounded corners of an actual pattern, the circuit pattern having rounded corners may be used as the target pattern. FIG. 6 shows an example where the circuit pattern having rounded corners is used and evaluation points are arranged for this target pattern. As shown in FIG. 6, the evaluation points EPi are arranged along the outer shape part of the target pattern 22.

Next, returning to FIG. 3, the explanation of the optical proximity correction continues. After setting the evaluation points in step S11, the parameters are set to the edges of the pattern shape 20 in the corrected mask pattern (S12). For example, the parameter $\theta j$ is set to the edge Ej of the pattern shape 20$j$, as shown in FIG. 4. The parameter $\theta k$ is set to the edge Ek of the pattern shape 20$k$. The symbols j and k are different natural numbers equal to or greater than 1 and equal to or less than N.

Figure 7:
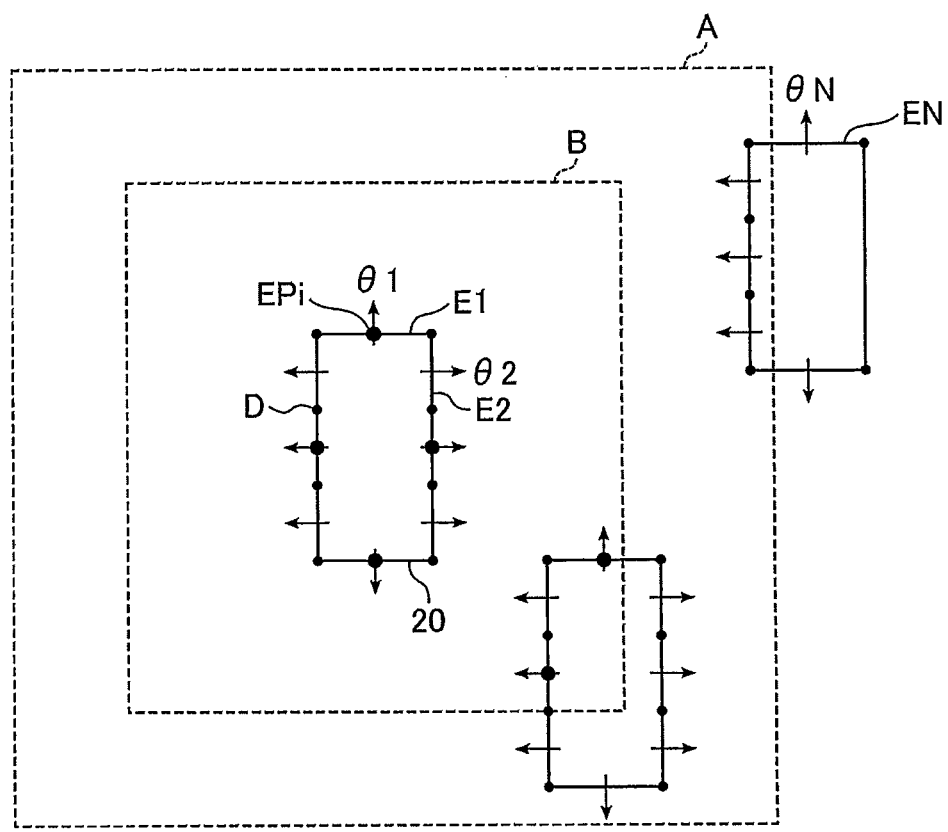
FIG. 7 is a diagram showing an example of edge segmentation and parameter setting performed on the circuit pattern shown in FIG. 5.

FIG. 7 shows an example where edge dividing and parameter setting are performed on the mask pattern shown in FIG. 5. As shown in FIG. 7, the pattern shape 20 is divided at dividing points D arranged at a predetermined interval. The plurality of divided outer parts, namely, the outer parts between the dividing points D, are set as the edges $E_1$, $E_2$, ..., $E_N$, respectively. Furthermore, the parameters $\theta_1$, $\theta_2$, ..., $\theta_N$, are set to the divided edges $E_1$, $E_2$, ..., $E_N$ (N is a natural number equal to or greater than 1), respectively. Each of the parameters $\theta_1$, $\theta_2$, ..., $\theta_N$ indicates an amount each of the edges $E_1$, $E_2$, ..., $E_N$ of the pattern shape 20 is moved in the corrected mask pattern.

Next, a set of evaluation points is set for each parameter that is set to an edge of the pattern shape 20 within the corrected mask pattern (S13). As shown in FIG. 4, for example, if the parameter $\theta j$ is set to the edge Ej of the pattern shape 20$j$, a plurality of evaluation points EPi which are present in the area Pj are set as one set of evaluation points. In other words, the evaluation points arranged within a certain distance from the edge Ej of the pattern shape 20$j$ are set as one set. This set of evaluation points will be referred to as an "evaluation point set Sj". The evaluation points EPi within the area Pj are evaluation points upon which an influence caused by the moving of the edge Ej by the parameter $\theta j$ is equal to or greater than a certain value.

For example, if the parameter $\theta k$ is set to the edge Ek of the pattern shape 20$k$, a plurality of evaluation points EPi which are present in the area Pk are set as one set of evaluation points. In other words, the evaluation points arranged within the certain distance from the edge Ek of the pattern shape 20$k$ are set as one set. This set of evaluation points will be referred to as an "evaluation point set Sk". The evaluation points EPi within the area Pk are evaluation points upon which an influence caused by the moving of the edge. Ek by the parameter $\theta k$ is equal to or greater than a certain value.

When the above-described edges Ej and Ek are moved by the parameters $\theta j$ and $\theta k$, respectively, the determination as to whether or not the influence upon the evaluation points is equal to or greater than a predetermined value is made in a manner described below. For example, the optical image intensity I on the evaluation points expressed by the following Expression (1) is calculated and the determination is made based on whether or not the calculated optical image intensity I is equal to or greater than a certain value.

$$I = \sum_{k=1}^{N} \sigma_k |\phi_k \otimes M|^2 \quad (1)$$

Herein, N represents a total number of SOCS kernels, $\phi$ represents a SOCS kernel, M represents a mask function, and $\sigma$ represents an eigenvalue. The SOCS kernel is a kernel (eigenvector) that represents an image forming performance of an optical system.

Figure 8:
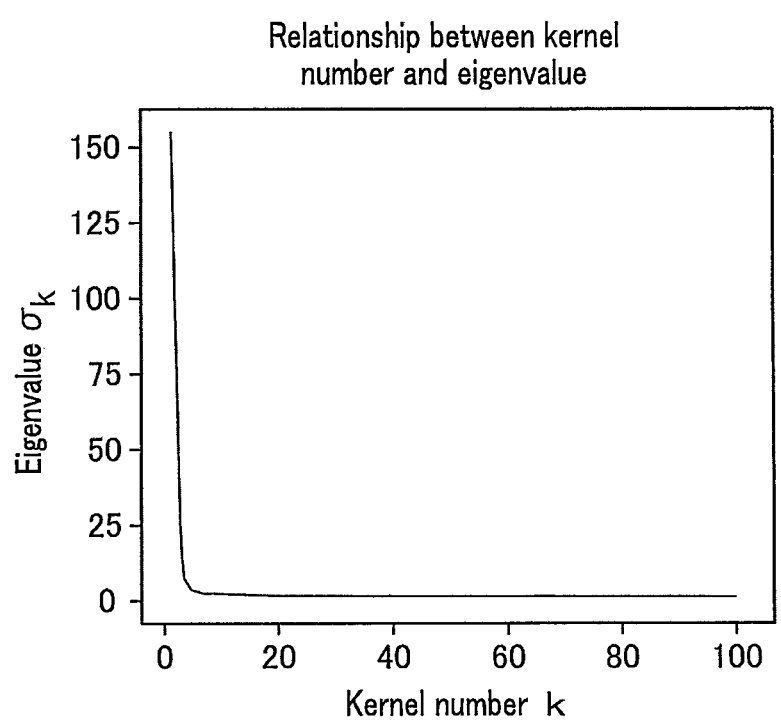
FIG. 8 is a diagram showing an example of a relationship between a kernel number and an eigenvalue in the embodiment.
Figure 9:
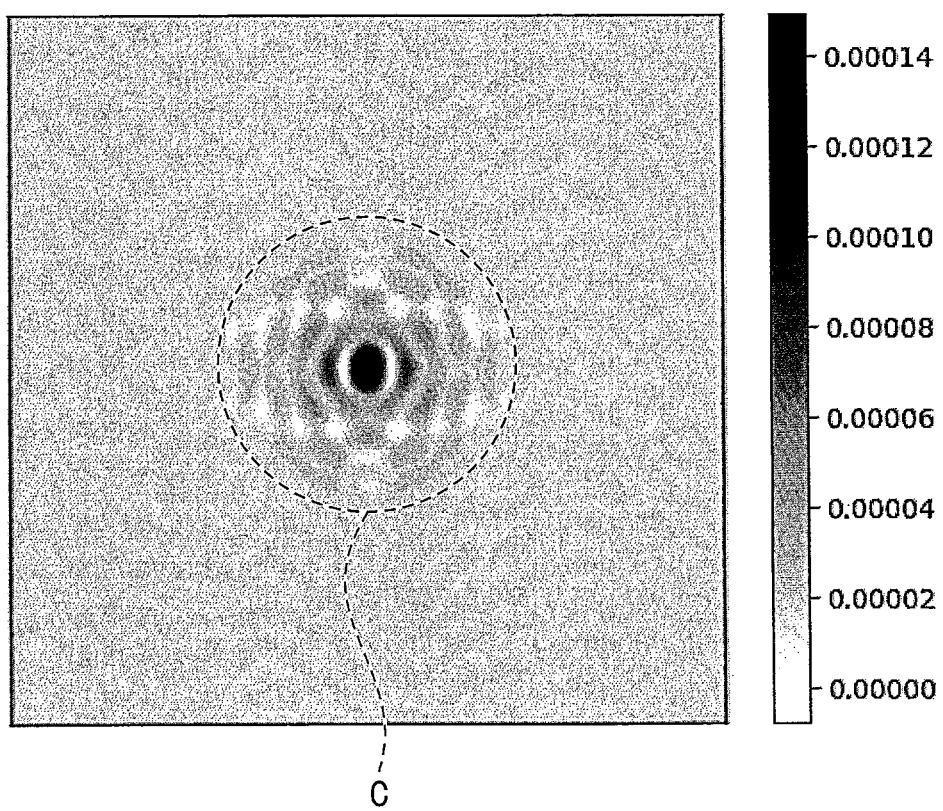
FIG. 9 is a diagram showing an example of a SOCS kernel of a maximum eigenvalue in the embodiment.

FIG. 8 shows an example of the relationship between the kernel number and the eigenvalue, and FIG. 9 shows an example of the SOCS kernel of a maximum eigenvalue. For example, as shown in FIG. 8, the larger the eigenvalue of the kernel is, the greater the contribution to the optical image intensity is. On the other hand, a kernel having a small eigenvalue only has a minute influence compared to the kernel having the maximum eigenvalue, although this does not mean that the former makes no contribution to the optical image intensity. Therefore, if an area other than 0 is taken into account in the kernel having the maximum eigenvalue, it is possible to estimate the range that would affect the accuracy in optical image calculation. Thus, as shown in FIG. 9, if the range in which the influence of the evaluation points upon the optical image intensity is great, in other words equal to or greater than a certain value, defined to be within the area C, the evaluation points corresponding to this range are selected in such a manner that they belong to the evaluation point set Sj or Sk.

Next, a combination of parameters is configured in such a manner that the plurality of evaluation point sets do not include the same evaluation point (S14). For example, a parameter combination is selected in such a manner that there are no common evaluation points between the above-described evaluation point sets Sj and Sk, in other words, the evaluation point set Sj and the evaluation point set Sk do not share a common evaluation point. In other words, when the evaluation point set Sj relating to the parameter θj and the evaluation point set Sk relating to the parameter θk are set, a combination of parameters is selected so that the evaluation point set Sk (or Sj) does not include an evaluation point included in the evaluation point set Sj (or Sk). Specifically, a set of evaluation points which are affected by the moving of the edge Ej by the parameter θj to a degree greater than the certain value (namely, the evaluation points in the area Pj) are calculated. Next, a set of evaluation points relating to the parameter θk that can be regarded as those which can share an optical image with the evaluation points in the area Pj (namely, the evaluation points in the area Pk) are selected. Thus, a combination of the parameter θj and the parameter θk is determined.

Next, the values of the selected parameters θj and θk are optimized (S15). First, the optical image intensity Ii on the evaluation points EPi in the area Pj is calculated. Thereafter, an objective function is computed based on the calculated optical image intensity Ii. The objective function calculates an evaluation value for evaluating the optical image intensity Ii of the evaluation points EPi.

The objective function fj(θ) relating to the evaluation points in the area Pj is expressed as the following Expression (2):

$$f_j(\theta) = \sum_{i \in P_j} (I_i - th)^2 \quad (2)$$

Herein, th represents an optical intensity corresponding to a threshold value of a photoresist. The optical intensity corresponding to the threshold value means a minimum value of the intensity of an optical image with which the photoresist is patterned through development of the optical image formed on the photoresist from light irradiated on the mask pattern passed through a projection lens system.

Furthermore, when a partial differential relating to θj is performed, Expression (2) is expressed as the following Expression (3):

$$\frac{\partial f_j(\theta)}{\partial \theta_j} \quad (3)$$

Furthermore, the objective function fj(θ) and its partial differential are calculated, and at the same time, the objective function fk(θ) and its partial differential relating to the evaluation points in the area Pk are computed. In other words, the optical image intensity Ii on the evaluation points in the area Pk is calculated and an objective function is further calculated based on the calculated optical image intensity Ii.

The objective function fk(θ) relating to the evaluation points in the area Pk is expressed by the following Expression (4):

$$f_k(\theta) = \sum_{i \in P_k} (I_i - th)^2 \quad (4)$$

Then, when a partial differential relating to θk is performed, Expression (4) can be expressed as the following Expression (5):

$$\frac{\partial f_k(\theta)}{\partial \theta_k} \quad (5)$$

The optical image of the evaluation points in the areas Pj and Pk used herein is an image formed on a photoresist corresponding to the evaluation points from light irradiated on the same corrected mask pattern passed through a projection lens system.

Next, the parameter θj is consecutively optimized using a value of a partial differential of the parameter θj in the objective function fj(θ) so that the objective function fj(θ) is minimized. Similarly, the parameter θk is consecutively optimized using a value of a partial differential of the parameter θk in the objective function fk(θ) so that the objective function fk(θ) is minimized.

Next, when the parameters θj and θk are optimized, it is determined whether or not the objective functions fj(θ) and fk(θ) converge within a certain period of time (S16). In other words, it is determined if the objective functions fj(θ) and fk(θ) are approximated to 0 within a certain period of time. If the objective functions fj(θ) and fk(θ) do not converge within a certain period of time (No), the process returns to step S15 and the parameters θj and θk are optimized once again. If the objective functions converge within a certain period of time (Yes), the optical proximity correction is finished.

3. Modifications

In the foregoing embodiment, as shown in FIGS. 5 and 6, the evaluation points EP are set on the circuit pattern and the target pattern; however, the evaluation points may be set on the auxiliary pattern as well. The auxiliary pattern may also be referred to as a sub-resolution assist feature (SRAF). The auxiliary pattern is a pattern generated together with the corrected mask pattern but not transferred onto a photoresist or a semiconductor substrate to form a target pattern. FIG. 10 shows an example where the evaluation points EPi are set on the auxiliary pattern 30. The auxiliary pattern 30 is arranged around the pattern shape 20, and the evaluation points EPi are set on the auxiliary pattern 30.

The objective function f(θ) regarding the evaluation points on the auxiliary pattern 30 can be expressed as the following Equation (6):

$$f(\theta) = \begin{cases} 0 & , \text{if } I_i < c1 \times th \\ c2 \times \exp(|I_i - c1 \times th|), & \text{otherwise} \end{cases} \quad (6)$$

Herein, c1 represents a coefficient (e.g., 0.7), and c2 represents a coefficient.

The optical intensity within the auxiliary pattern 30 is set at a value sufficiently smaller than the threshold th so that the auxiliary pattern 30 is not transferred onto a photoresist. Accordingly, when the optical intensity is greater than "c1×th", a penalty is imposed. exp(|Ii−th|) is an example, and the penalty may be expressed by a different expression. The objective function f(θ) regarding the evaluation points on the auxiliary pattern 30 is designed so that the auxiliary pattern is not transferred onto a photoresist. If the optical image intensity Ii of the evaluation points on the auxiliary pattern 30 exceeds the threshold value th, the auxiliary pattern 30 is transferred onto a photoresist; for this reason, it is necessary to proceed with optical proximity correction while avoiding the optical image intensity Ii exceeding the threshold value th. Therefore, there is no problem if the optical image intensity Ii on the auxiliary pattern 30 is lower than the threshold th, so the objective function f(θ) is designed in such a manner that the evaluation value calculated by the objective function is 0. The objective function f(θ) is designed on the other hand in such a manner that the evaluation value is greater than 0 if the optical image intensity Ii on the auxiliary pattern 30 exceeds the threshold th. Herein, designing the objective function f(θ) as an operation expression that produces a value greater than 0 is expressed as "imposing a penalty". In the above Expression (6), considerations are given to process fluctuations and convergence, and the threshold is "c1×th", not "th", so as to obtain a stable reliability for various fluctuations.

Figure 11:
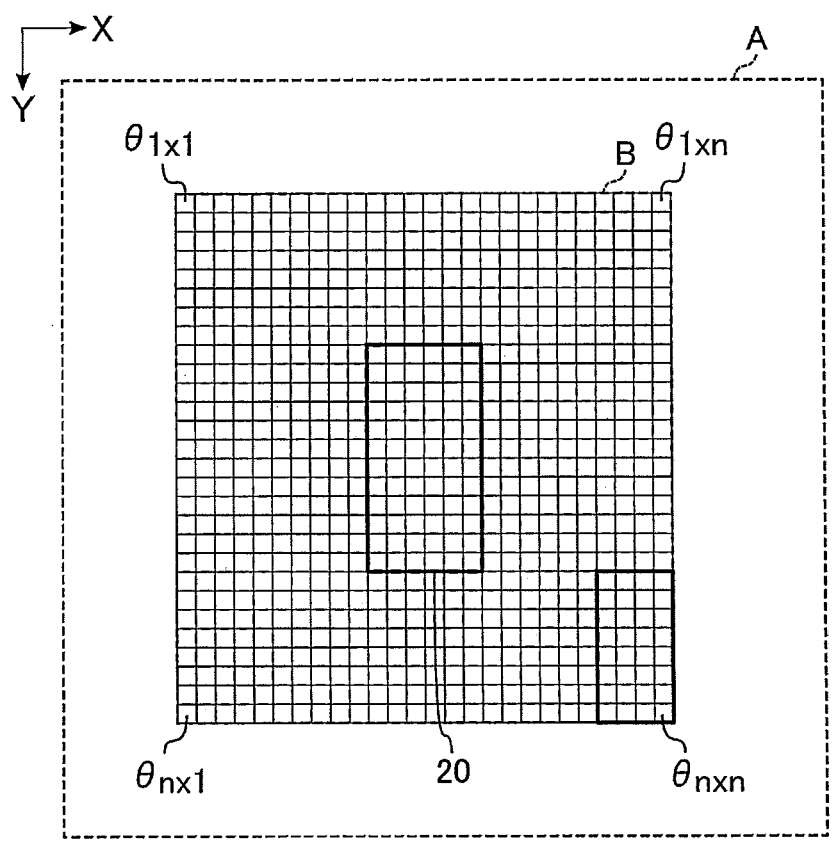
FIG. 11 is a diagram showing an example in which a mask pattern is placed on a grid area in a modification.

In the foregoing embodiment, the parameters θ are set to divided edges as shown in FIG. 7; however, grid-patterned areas may be set on a mask and each grid-patterned area may be set with the parameter θ. FIG. 11 shows an example in which the pattern shape 20 is placed on the grid-patterned areas. As shown in FIG. 11, the area B is partitioned (or discretized) into a plurality of cells in a grid pattern. Here, n cells are aligned in each of the X direction and the Y direction. Each cell is set with the parameter $\theta_{1\times1}$, $\theta_{1\times2}$, . . . , $\theta_{n\times n}$ in the X direction and the Y direction from the top left cell. It is thereby possible to express the portion corresponding to the edge of the pattern shape 20 with one or more parameters $\theta_{M\times N}$ (M and N are natural numbers equal to or greater than 1 and equal to or smaller than n). Such a parameter setting method is effective in the case where a mask pattern has a complicated shape.

4. Effects of Embodiment

According to the embodiment, a mask design method that improves efficiency of mask pattern design and a storage medium of the method can be provided.

Effects of the embodiment will be described below. In the present embodiment, for example, a set of evaluation points belonging to a first edge of a mask pattern (hereinafter a "first evaluation point set") and a set of evaluation points belonging to a second edge of a mask pattern (hereinafter a "second evaluation point set") are set, and the same optical image is used for the computation of objective functions for evaluating the first evaluation point set and the second evaluation point set. The same optical image is an image formed on a photoresist corresponding to the evaluation points in the first evaluation point set and the second evaluation point set from light radiated onto the same corrected mask pattern passed through the projection lens system.

The first evaluation set includes evaluation points in which an influence of the moving of the first edge upon the optical image is equal to or greater than a predetermined value. The second evaluation set includes evaluation points in which an influence of the moving of the second edge upon the optical image is equal to or greater than the predetermined value. The first evaluation point set, on the other hand, includes evaluation points in which an influence of the moving of the second edge upon the optical image is smaller than the predetermined value, and the second evaluation point set includes the evaluation points in which an influence of the moving of the first edge upon the optical image is smaller than the predetermined value.

It is thus possible to perform the objective function computation using the same optical image; it is thereby possible to reduce the number of times of performing the objective function computation. It is thereby possible to shorten a time necessary to optimize an amount the parameter is moved. Furthermore, since each of the first evaluation point set and the second evaluation point set includes evaluation points that would greatly affect the optical image, it is possible to improve convergence of the evaluation value calculated by the objective function.

According to the present embodiment, it is possible to improve the speed and the convergence in the objective function computation by selecting evaluation points for an edge not affected by the moving of the edge of a mask pattern in such a manner that an amount an edge is moved can be optimized.

According to the foregoing embodiment, it is possible to reduce a time required for designing a mask pattern and to improve efficiency in mask pattern design in a mask design method using optical proximity correction.

While certain embodiments have been described, these embodiments have been presented by way of example only, and are not intended to limit the scope of the inventions. These embodiments may be implemented in various other forms, and various omissions, replacements, and changes can be made without departing from the gist of the invention. The embodiments and their modifications are included in the scope and spirit of the invention and are included in the scope of the claimed inventions and their equivalents.

The invention claimed is:

1. A mask design method for designing a mask pattern using optical proximity correction, the method comprising:
setting evaluation points on a circuit pattern created based on design data;
setting a parameter that defines a shape of the mask pattern on at least part of the mask pattern corresponding to the circuit pattern;
calculating an optical image intensity on the evaluation points that are set on the circuit pattern based on the mask pattern and the parameter;
calculating an evaluation value relating to the optical image intensity by an objective function based on the optical image intensity; and
optimizing the parameter using a value of a partial differential for the parameter in the objective function to minimize the evaluation value calculated by the objective function, wherein a set of the evaluation points used in computation of the objective function is changed for each parameter when computation of the partial differential is performed.

2. The mask design method according to claim 1, wherein the set of evaluation points includes evaluation points in which an influence of a change of the parameter upon the optical image intensity is equal to or greater than a first value in the computation of the partial differential.

3. The mask design method according to claim 2, wherein the parameter includes a first parameter and a second parameter differing from the first parameter, the set of the evaluation points includes a set of first evaluation points corresponding to the first parameter and a set of second evaluation points corresponding to the second parameter,
a combination of the first parameter and the second parameter is selected so that the set of first evaluation points and the set of second evaluation points do not include any common evaluation points, and a same optical image is used to calculate the optical image intensity in the evaluation points included in the set of first evaluation points and to calculate the optical image intensity in the evaluation points included in the set of second evaluation points.

4. The mask design method according to claim 3, wherein the same optical image includes an image formed on each of the evaluation points included in the set of first evaluation points and the set of second evaluation points from light irradiated onto the mask pattern passed through a projection lens.

5. The mask design method according to claim 1, wherein the mask pattern further includes an auxiliary pattern which is not transferred onto a semiconductor substrate, and
the evaluation points are also set on the auxiliary pattern in the setting of the evaluation points.

6. The mask design method according to claim 1, wherein the parameter is set to a side of a part of a divided pattern of the mask pattern in the setting of the parameter.

7. The mask design method according to claim 1, wherein the parameter is set to each cell of a grid pattern, which is a discretized area of the mask pattern in the setting of the parameter.

8. A non-transitory computer-readable storage medium storing a program for causing a computer to execute a mask design method for designing a mask pattern using optical proximity correction, wherein the program is caused to:
set evaluation points on a circuit pattern created based on design data;
set a parameter that defines a shape of a mask pattern on at least part of the mask pattern corresponding to the circuit pattern;
calculate an optical image intensity on the evaluation points that are set on the circuit pattern based on the mask pattern and the parameter;
calculate an evaluation value relating to the optical image intensity by an objective function based on the optical image intensity; and
optimize the parameter using a value of a partial differential for the parameter in the objective function to minimize the evaluation value calculated by the objective function, wherein a set of the evaluation points used in computation of the objective function is changed for each parameter when computation of the partial differential is performed.

9. The non-transitory computer-readable storage medium according to claim 8, wherein
the set of evaluation points includes evaluation points in which an influence of a change in the parameter upon the optical image intensity is equal to or greater than a first value in the computation of the partial differential.

10. The non-transitory computer-readable storage medium according to claim 9, wherein
the parameter includes a first parameter and a second parameter differing from the first parameter, and the set of the evaluation points includes a set of first evaluation points corresponding to the first parameter and a set of second evaluation points corresponding to the second parameter,
a combination of the first parameter and the second parameter is selected so that the set of first evaluation points and the set of second evaluation points do not include any common evaluation points, and a same optical image is used to calculate the optical image intensity in the evaluation points included in the set of first evaluation points and to calculate the optical image intensity in the evaluation points included in the set of second evaluation points.

11. The non-transitory computer-readable storage medium according to claim 10, wherein
the same optical image includes an image formed on each of the evaluation points included in the set of first evaluation points and the set of second evaluation points from light irradiated onto the mask pattern passed through a projection lens.

12. The non-transitory computer-readable storage medium according to claim 8, wherein
the mask pattern further includes an auxiliary pattern that is not transferred onto a semiconductor substrate,
the evaluation points are also set on the auxiliary pattern in the setting of the evaluation points.

13. The non-transitory computer-readable storage medium according to claim 8, wherein
the parameter is set to a side of a part of a divided pattern of the mask pattern in the setting of the parameter.

14. The non-transitory computer-readable storage medium according to claim 8, wherein
the parameter is set to each cell of a grid pattern, which is a discretized area of the mask pattern in the setting of the parameter.

* * * * *